US010717307B2

(12) United States Patent
 Ishii

(10) Patent No.: US 10,717,307 B2
(45) Date of Patent: Jul. 21, 2020

(54) MEDIUM AND PRINTER

(71) Applicant: Brother Kogyo Kabushiki Kaisha, Nagoya-shi, Aichi-ken (JP)

(72) Inventor: Hidekazu Ishii, Inazawa (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 16/234,074

(22) Filed: Dec. 27, 2018

(65) Prior Publication Data
 US 2019/0224995 A1   Jul. 25, 2019

(30) Foreign Application Priority Data

Jan. 23, 2018 (JP) ................................ 2018-009062

(51) Int. Cl.
 *B41J 13/00* (2006.01)
 *G06Q 10/08* (2012.01)
 *B41J 15/04* (2006.01)
 *B41J 11/00* (2006.01)
 *B41J 3/407* (2006.01)

(52) U.S. Cl.
 CPC ......... *B41J 13/0009* (2013.01); *B41J 3/4075* (2013.01); *B41J 11/0075* (2013.01); *B41J 15/044* (2013.01); *G06Q 10/0875* (2013.01)

(58) Field of Classification Search
 CPC .. B41J 13/0009; B41J 3/4075; B41J 11/0075; B41J 15/044; B41J 11/009; G06Q 10/0875; G06Q 10/087; G06Q 20/203; G06Q 30/0633; G06Q 50/128; H04M 1/2323; G06K 15/4065

USPC ......................................................... 347/218
See application file for complete search history.

(56) References Cited

U.S. PATENT DOCUMENTS

| 6,999,190 B2 | 2/2006 | Shimbori et al. |
| 7,321,441 B2 | 1/2008 | Matsugi |
| 2003/0063315 A1 | 4/2003 | Nunokawa |
| 2004/0114177 A1 | 6/2004 | Matsugi |
| 2004/0204986 A1 | 10/2004 | Shimbori et al. |

(Continued)

FOREIGN PATENT DOCUMENTS

| EP | 1197842 A2 | 4/2002 |
| JP | H03-247480 A | 11/1991 |

(Continued)

Primary Examiner — Huan H Tran
Assistant Examiner — Alexander D Shenderov
(74) Attorney, Agent, or Firm — Banner & Witcoff, Ltd.

(57) ABSTRACT

A non-transitory computer-readable medium storing a storage body management program for executing steps is provided. In a registration step, a total number of owned storage bodies including the storage body attached to an attaching part is acquired and registered. In a totalization step, consumption amounts of the storage bodies in the printer are totalized based on an identification result and a detection result. In a calculation step, an average consumption amount per unit period of the storage bodies are calculated based on a totalization result. In a prediction step, a consumption completion timing of the storage bodies is predicted based on a registration result and a calculation result. In an order step, an order process for at least one type of the storage bodies is executed in accordance with a prediction result and an expected delivery period of the storage bodies.

12 Claims, 12 Drawing Sheets

(56) References Cited

U.S. PATENT DOCUMENTS

2013/0144757 A1* 6/2013 Bauer .................. G06K 7/0008
                                                       705/26.61
2018/0095398 A1* 4/2018 Yoshida ............. G06K 15/4065

FOREIGN PATENT DOCUMENTS

| JP | H05-270082 A | 10/1993 |
| JP | H11-157174 A | 6/1999 |
| JP | H11-327855 A | 11/1999 |
| JP | 2001-296983 A | 10/2001 |
| JP | 2002-032671 A | 1/2002 |
| JP | 2002-202862 A | 7/2002 |
| JP | 2003-177884 A | 6/2003 |
| JP | 2004-054911 A | 2/2004 |
| JP | 2004-227492 A | 8/2004 |
| JP | 2004-272672 A | 9/2004 |
| JP | 2005-074769 A | 3/2005 |
| JP | 2006-195506 A | 7/2006 |
| JP | 2009-129180 A | 6/2009 |
| JP | 2010-009541 A | 1/2010 |

\* cited by examiner

[FIG. 1]
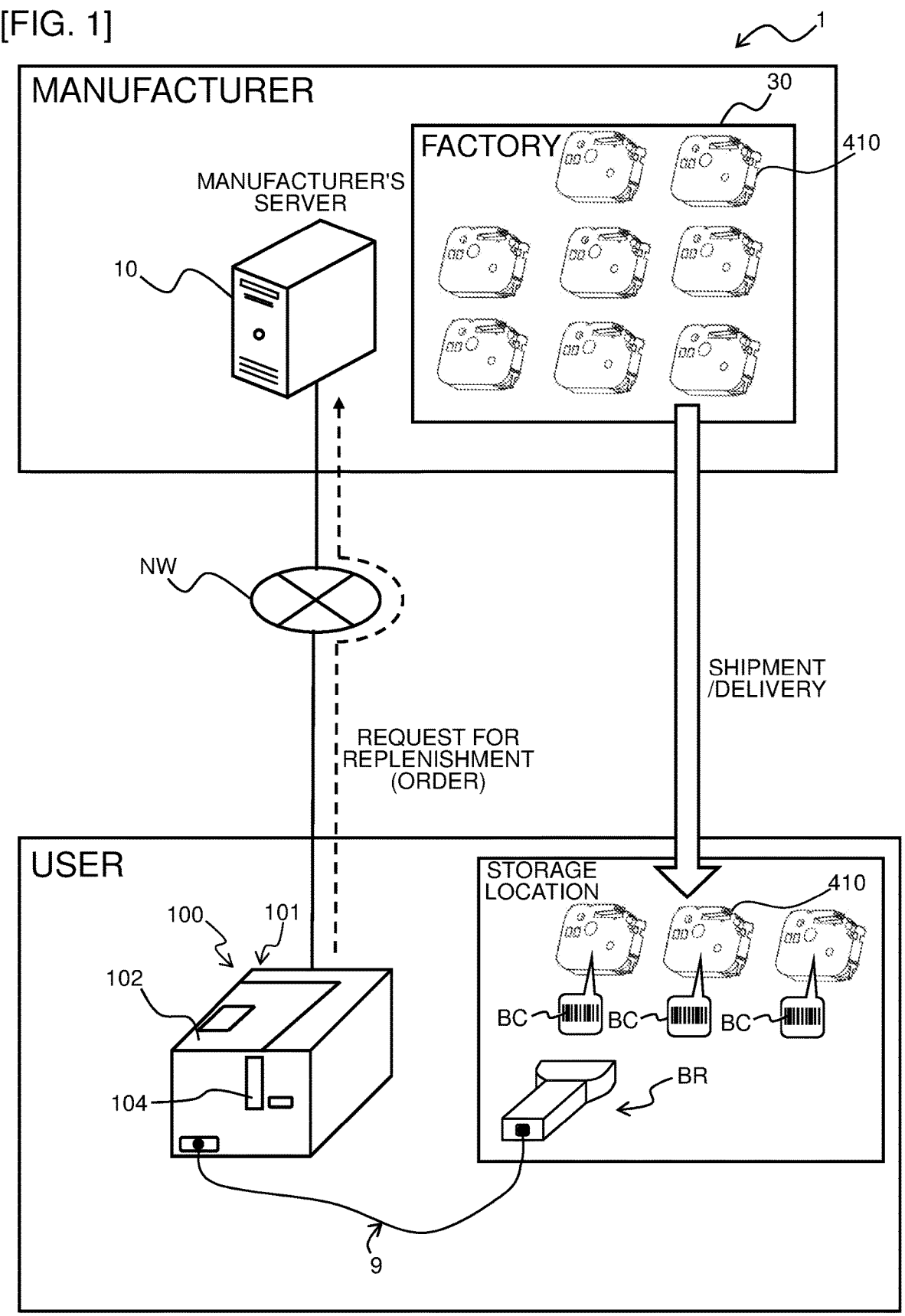

[FIG. 2]
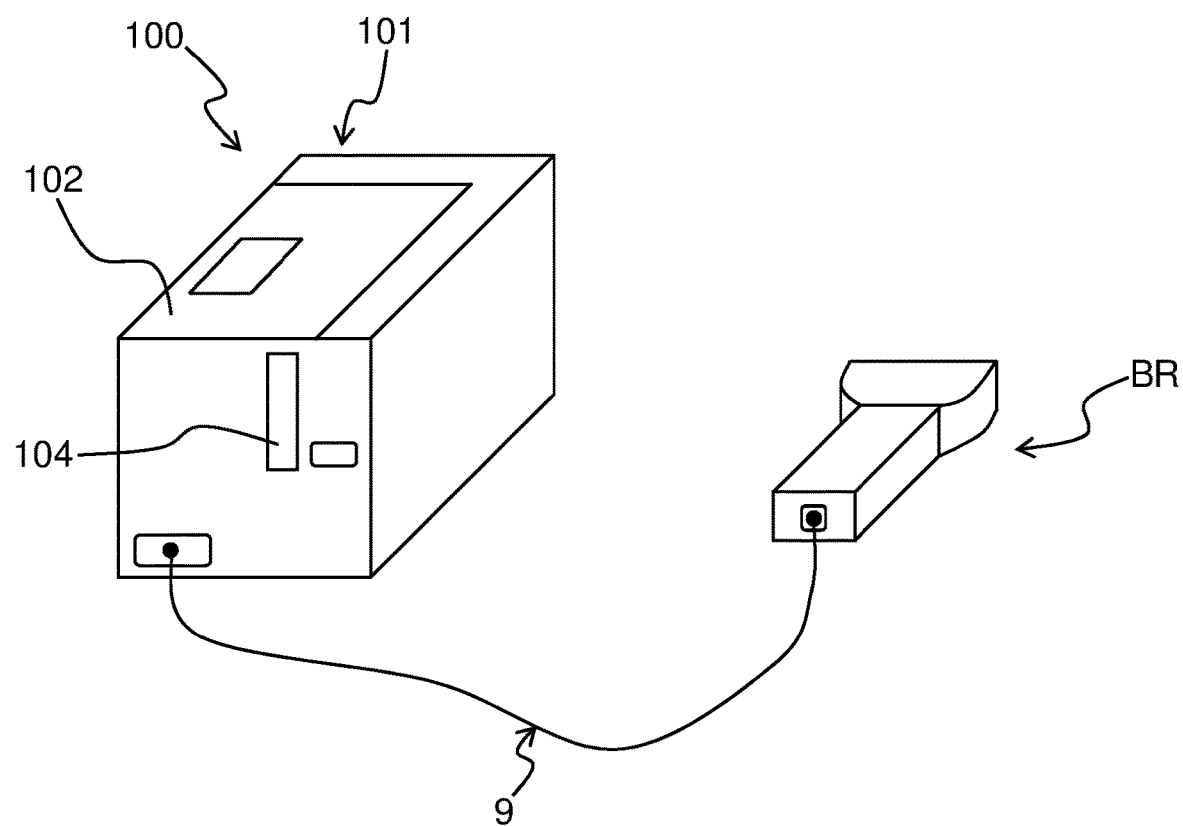

[FIG. 3]
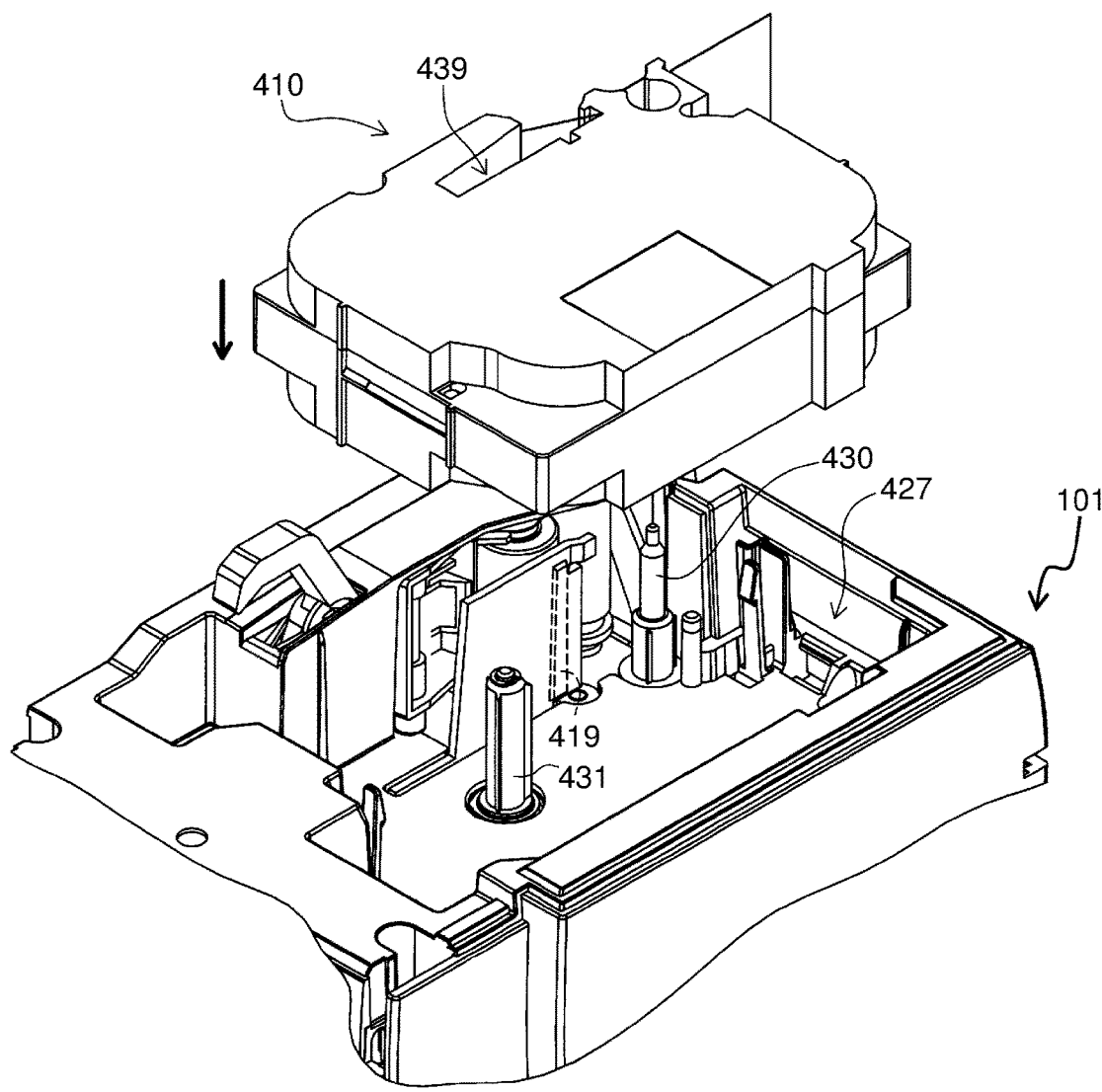

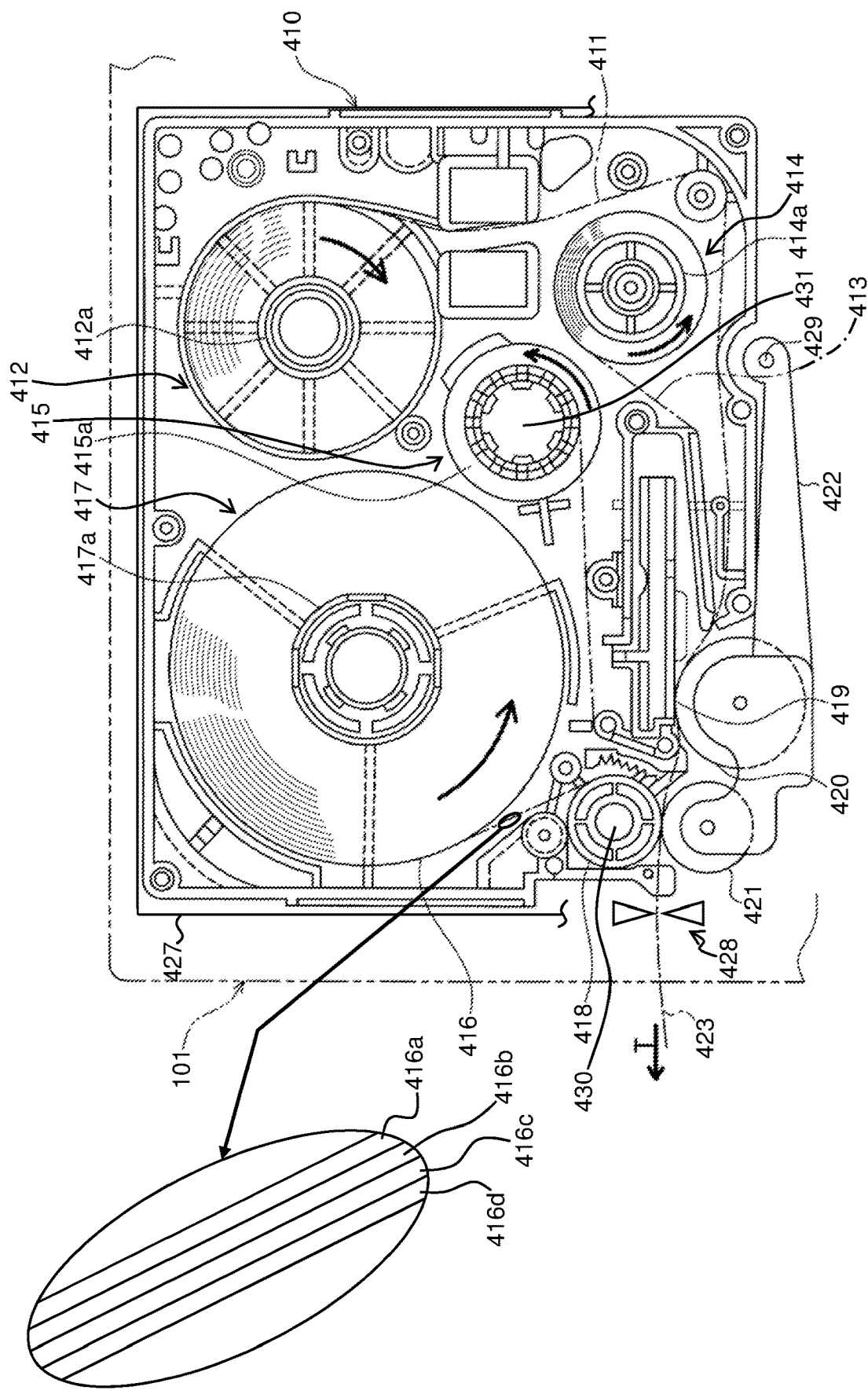
[FIG. 4]

[FIG. 5]
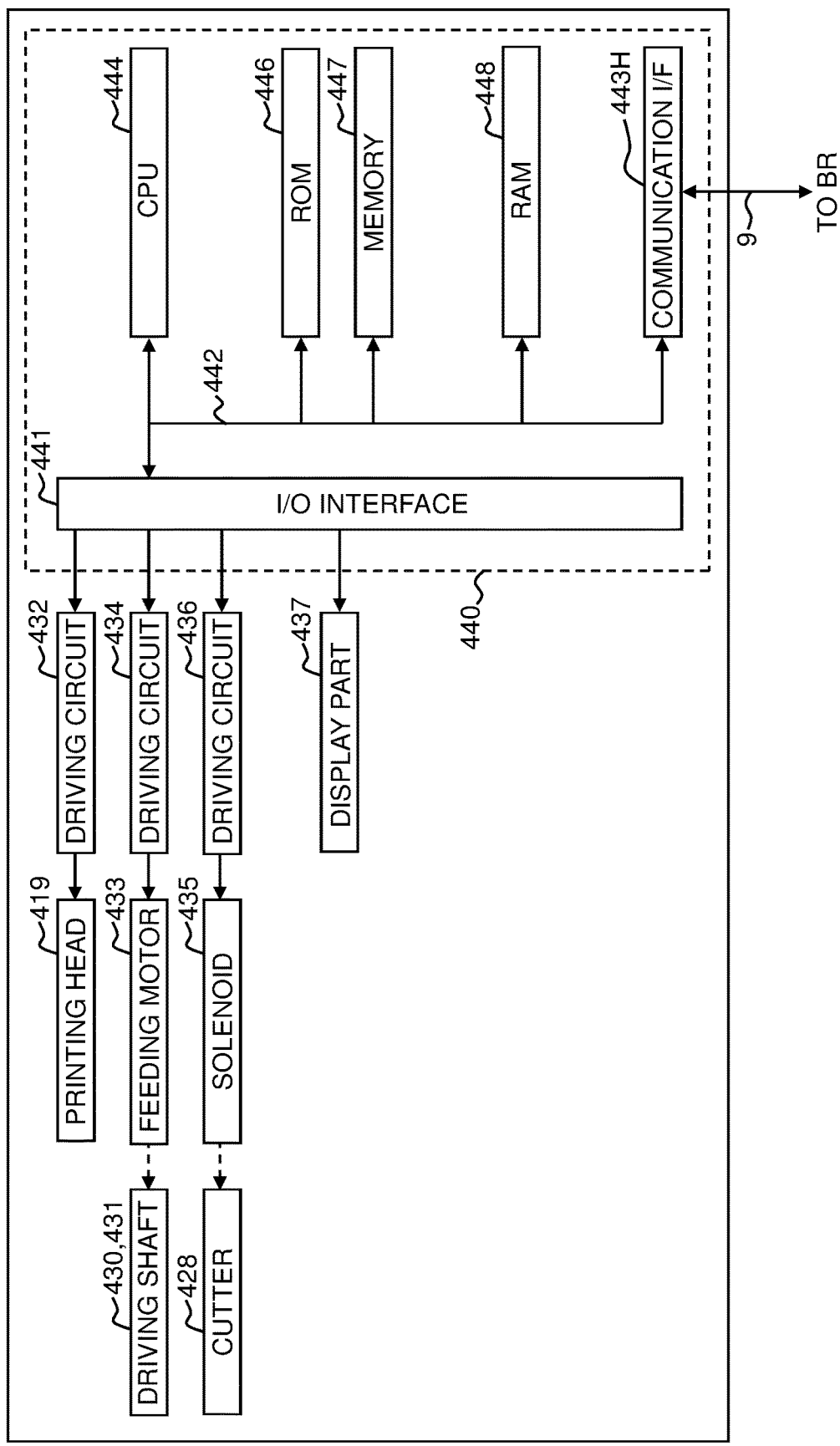

[FIG. 6]
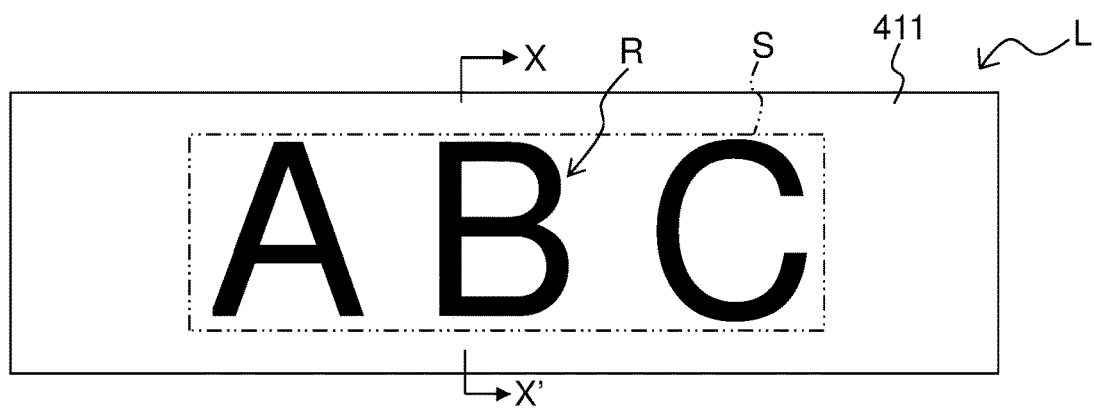
[FIG. 7]
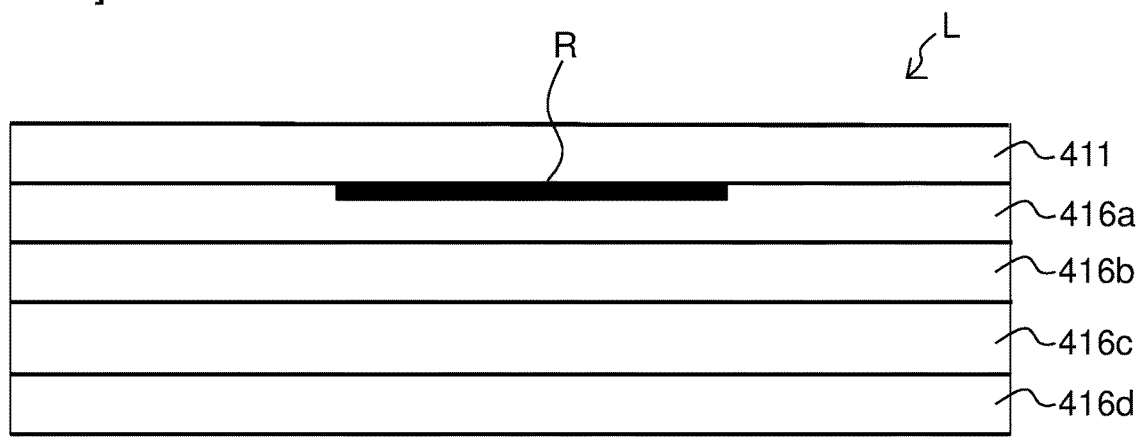

[FIG. 8]
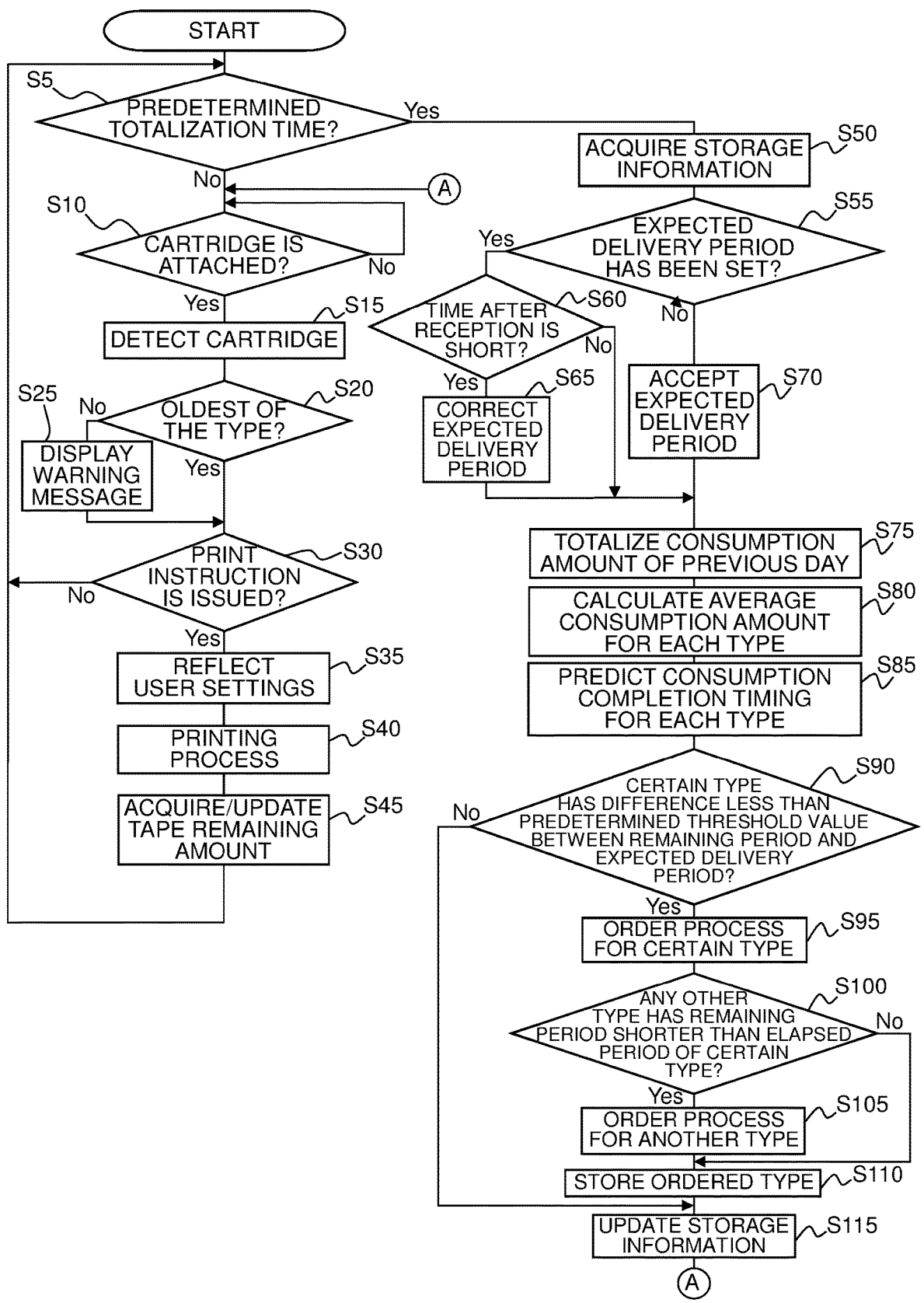

[FIG. 9]

CARTRIDGE OLDER THAN ATTACHED CARTRIDGE EXISTS.

USING THE FOLLOWING CARTRIDGE FIRST IS RECOMMENDED.

SER No. U64893E7Z256977

[FIG. 10A]

```
<STORAGE INFORMATION>    EXPECTED
【CARTRIDGE A】  ***      DELIVERY PERIOD
【CARTRIDGE B】  ***       * DAYS ±* DAYS
【CARTRIDGE C】  ***
【CARTRIDGE D】  ***
【CARTRIDGE E】  ***
【CARTRIDGE F】  ***
```

[FIG. 10B]

```
<STORAGE INFORMATION>    EXPECTED
【CARTRIDGE A】  20       DELIVERY PERIOD
【CARTRIDGE B】  10        5 DAYS ±1 DAY
【CARTRIDGE C】  5
【CARTRIDGE D】  NOT USED
【CARTRIDGE E】  10
【CARTRIDGE F】  NOT USED
```

[FIG. 11A]

| | NUMBER OF ELAPSED DAYS | CONSUMED CARTRIDGES | REMAINING CARTRIDGES | AVERAGE CONSUMPTION AMOUNT | REMAINING NUMBER OF DAYS | NUMBER OF ORDERS |
|---|---|---|---|---|---|---|
| CARTRIDGE A | 94 | 18.80 | 1.20 | 0.20 | 6.00 | 20 |
| CARTRIDGE B | - | 4.70 | 5.30 | 0.05 | 106.00 | 0 |
| CARTRIDGE C | - | 0.94 | 4.06 | 0.01 | 406.00 | 0 |
| CARTRIDGE E | - | 3.76 | 6.24 | 0.04 | 156.00 | 0 |

[FIG. 11B]

| | NUMBER OF ELAPSED DAYS | CONSUMED CARTRIDGES | REMAINING CARTRIDGES | AVERAGE CONSUMPTION AMOUNT | REMAINING NUMBER OF DAYS | NUMBER OF ORDERS |
|---|---|---|---|---|---|---|
| CARTRIDGE A | 94 | 18.80 | 1.20 | 0.20 | 6.00 | 20 |
| CARTRIDGE B | - | 7.52 | 2.48 | 0.08 | 31.00 | 5 |
| CARTRIDGE C | - | 0.94 | 4.06 | 0.01 | 406.00 | 0 |
| CARTRIDGE E | - | 3.76 | 6.24 | 0.04 | 156.00 | 0 |

[FIG. 12A]
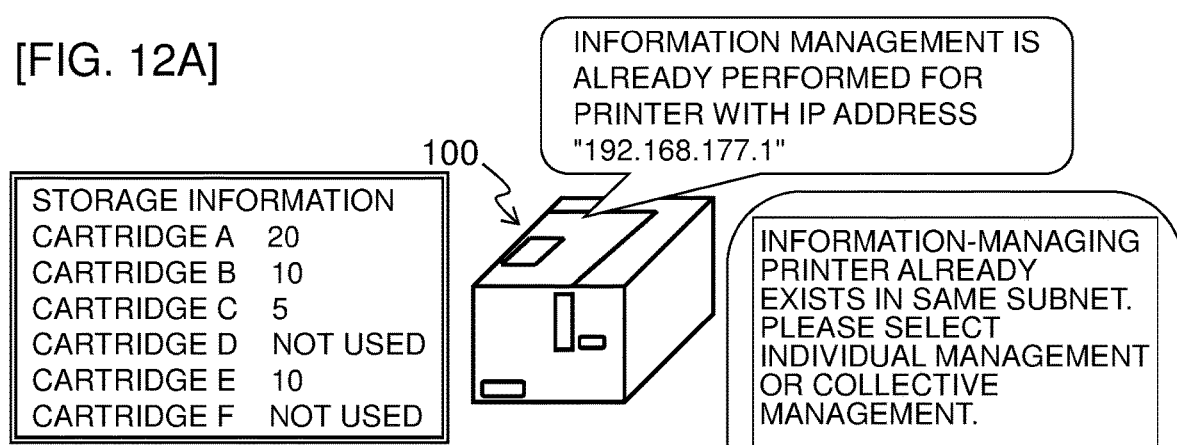
[FIG. 12B]
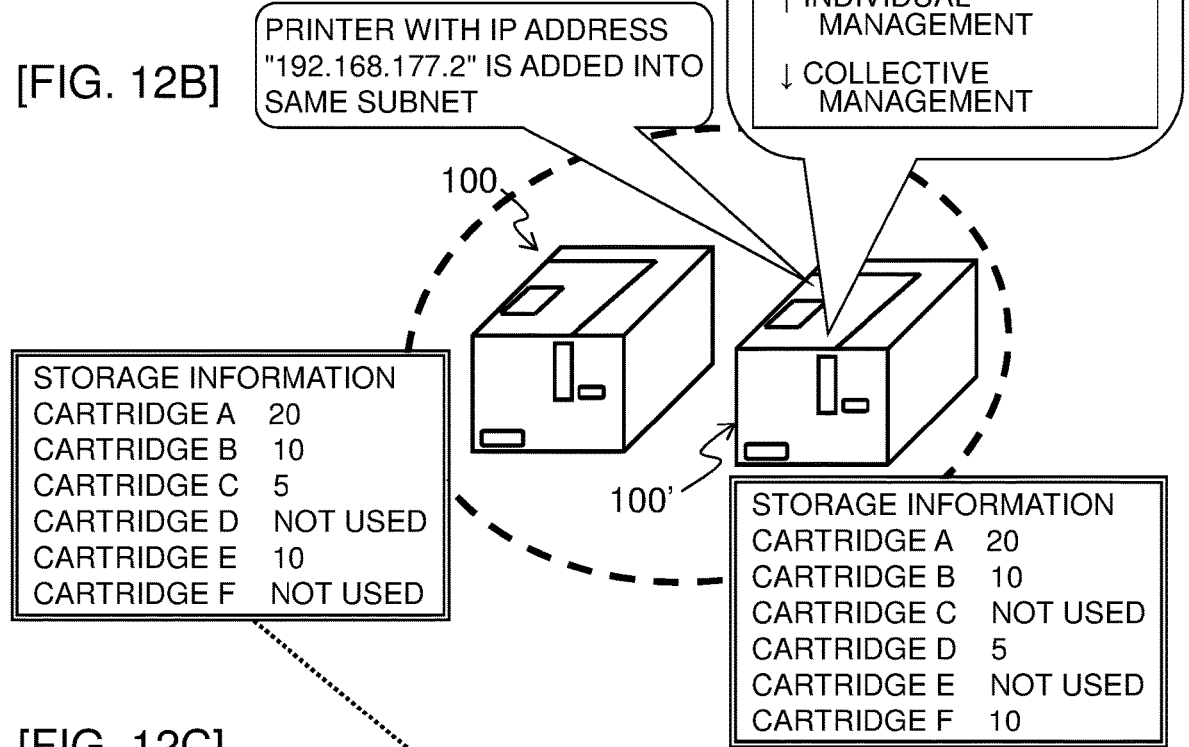
[FIG. 12C]
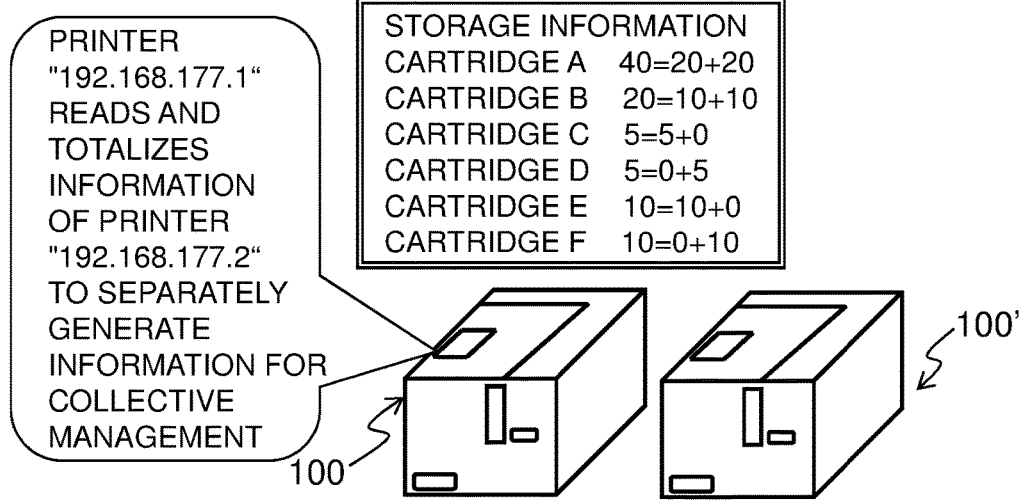

[FIG. 13]
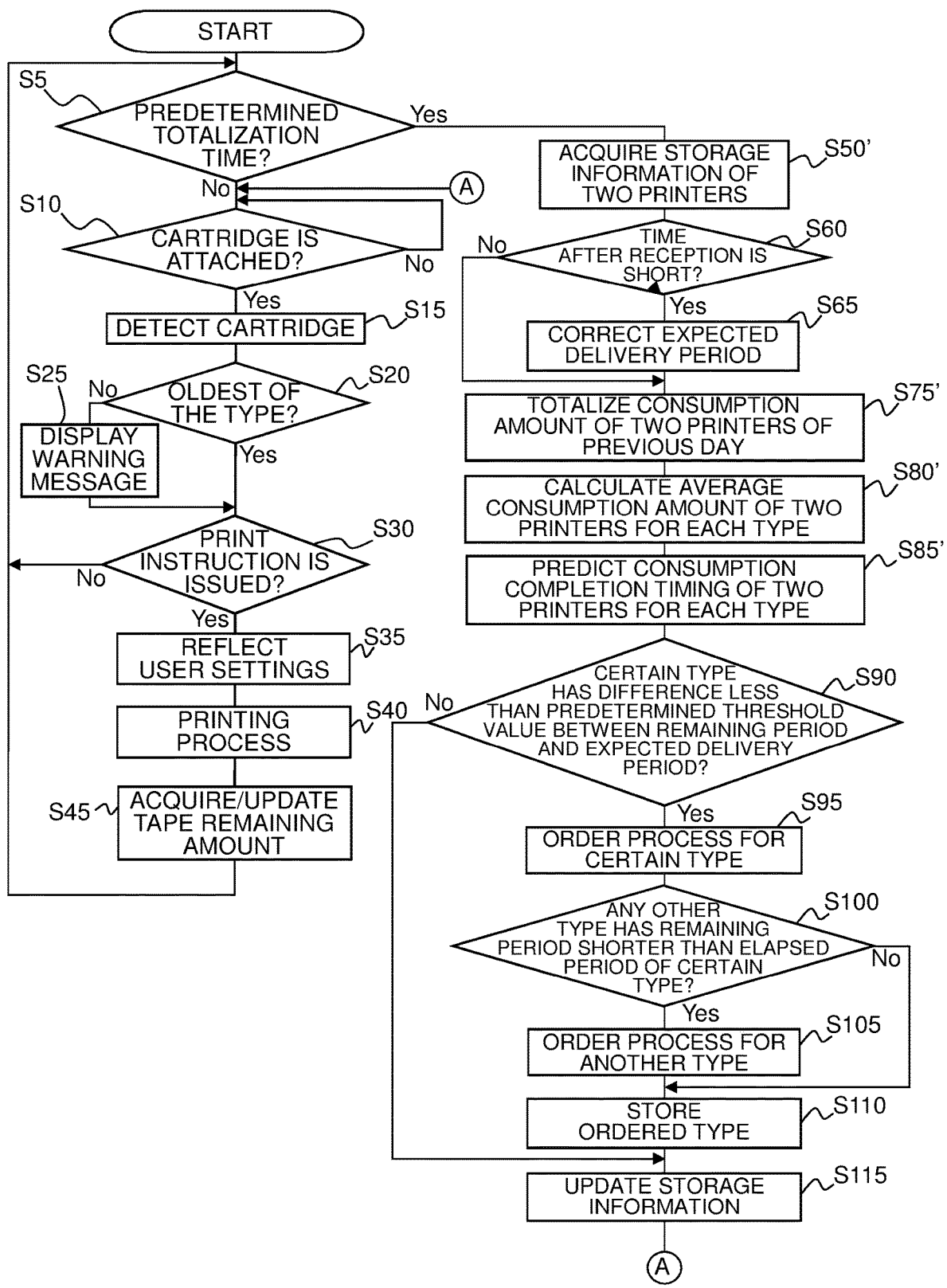

MEDIUM AND PRINTER

CROSS-REFERENCE TO RELATED APPLICATION

The present application claims priority from Japanese Patent Application No. 2018-009062, which was filed on Jan. 23, 2018, the disclosure of which is incorporated herein by reference in its entirety.

BACKGROUND

Field

The present disclosure relates to a medium recording a storage body management program for managing a storage body storing a print-receiving medium of a printer in a suppliable manner, and a printer on which the program is executed.

Description of the Related Art

In a printer, a print is formed on a print-receiving medium by a printing means to form a printed matter. As the printed matter is successively formed, the print-receiving medium is gradually consumed, and finally, the printable print-receiving medium runs out. In that case, a new print-receiving medium is attached to the printer and the formation of the printed matter is continued. In this way, the print-receiving medium (=consumables) is sequentially consumed by continuing the printed matter formation. Prior arts are already known in which a consumption status of such consumables of the printer is managed so that a request is made (=an order is placed) for replenishment of the consumables in the case of insufficiency in quantity.

However, depending on a consumption status of each type of a storage body, an order may be placed too early so that an elapse of a long period before actual use after reception results in a deterioration in quality, or expiration of a use period, of a print-receiving medium, or an order may be placed too late to be in time for use with a printer. Therefore, it may be difficult to place an order for storage bodies at an appropriate timing.

SUMMARY

An object of the present disclosure is to provide a medium recording a storage body management program, and a printer, capable of ordering a storing body at an appropriate timing in accordance with a consumption status of each type of a storage body.

In order to achieve the above-described object, according to aspect of the present application, there is provided a non-transitory computer-readable medium storing a storage body management program for executing steps on a computer of a printer including an attaching part configured to attach a storage body that stores a print-receiving medium in a suppliable manner, a feeder configured to feed the print-receiving medium supplied from the storage body attached to the attaching part, a printing head configured to perform a desired print on the print-receiving medium fed by the feeder, the computer configured to control the feeder and the printing head, and a remaining amount detecting device configured to detect a remaining amount of the print-receiving medium in the storage body attached to the attaching part, the steps comprising an identification step for identifying the storage body attached to the attaching part, a registration step for acquiring and registering a total number of owned storage bodies including the storage body attached to the attaching part for each of types of the storage bodies, a totalization step for totalizing consumption amounts of the storage bodies in the printer for each of the types on the basis of an identification result of the identification step and a detection result of the remaining amount detecting device, a calculation step for calculating an average consumption amount per unit period of the storage bodies for each of the types on the basis of a totalization result in the totalization step, a prediction step for predicting a consumption completion timing of the storage bodies for each of the types on the basis of a registration result of the registration step and a calculation result of the calculation step, and an order step for executing an order process for at least one type of the storage bodies in accordance with a prediction result of the prediction step and an expected delivery period of the storage bodies.

BRIEF DESCRIPTION OF THE DRAWINGS

FIG. 1 is a diagram showing an overall schematic configuration of a management system according to an embodiment of the present disclosure.

FIG. 2 is a configuration diagram showing a label printer together with a barcode reader.

FIG. 3 is a perspective view showing an appearance configuration of a cartridge holder inside a housing of the label printer and a cartridge to be attached thereto.

FIG. 4 is a view showing a peripheral portion of a cartridge holder in a cartridge-attached state together with the cartridge.

FIG. 5 is a functional block diagram showing a functional configuration of the label printer.

FIG. 6 is a plane view showing an example of an appearance of a print label.

FIG. 7 is a view acquired by rotating a cross-sectional view taken along a line X-X' of FIG. 6 by 90° counterclockwise.

FIG. 8 is a flowchart showing a control procedure executed by a CPU of the label printer.

FIG. 9 is an explanatory diagram showing an example of a warning message when ab attached storage body is not newest.

FIG. 10A is an explanatory diagram showing contents of storage information of cartridges.

FIG. 10B is an explanatory diagram showing the contents of storage information of cartridges.

FIG. 11A is a table for explaining an example of a totalization process result of consumption amounts of each type of cartridges, a calculation process result of an average consumption amount, and a prediction process result of consumption completion timing.

FIG. 11B is a table for explaining an example of a totalization process result of consumption amounts of each type of cartridges, a calculation process result of an average consumption amount, and a prediction process result of consumption completion timing.

FIG. 12A is an explanatory diagram showing a modification example in which two label printers are collectively managed.

FIG. 12B is an explanatory diagram showing a modification example in which two label printers are collectively managed.

FIG. 12C is an explanatory diagram showing a modification example in which two label printers are collectively managed.

FIG. 13 is a flowchart showing a control procedure executed by a CPU of the label printer.

DETAILED DESCRIPTION OF THE PREFERRED EMBODIMENTS

An embodiment of the present disclosure will now be described with reference to the drawings.

System Configuration Overview

FIG. 1 is a diagram showing an overall schematic configuration of a management system according to this embodiment.

In FIG. 1, a management system 1 includes a management server 10 owned by a manufacturer (corresponding to an example of a supplier), a label printer 100 owned by a user (corresponding to an example of a printer). The management server 10 and the label printer 100 are connected such that information can be transmitted to/received from each other through a network NW such as a communication network, for example.

In this example, the management server 10 is disposed in a factory 30 of a manufacturer that manufactures cartridges 410 described later. The present disclosure is not limited to the factory 30, and the server may be disposed in a warehouse etc. storing the cartridges 410. The present disclosure is not limited to the manufacturer, and the server may be disposed in a site of a vendor, a dealer, etc. selling the cartridges 410. Therefore, the management server 10 may be disposed in a facility from which the cartridges 410 can be shipped in accordance with a type and a number corresponding to details of an order from the label printer 100 described later. Alternatively, the present disclosure is not limited to those disposed in the facility, and the management server 10 may be disposed in a place different from the facility such that the server can recognize the status of the facility as needed and can give a shipping instruction.

The label printer 100 has a function of accessing the management server 10 via the network NW to enable transmission/reception of various kinds of information.

FIG. 2 is a configuration diagram showing the above described label printer 100 together with a bar code reader connected thereto.

As shown in FIG. 2 and FIG. 1, the above described barcode reader BR is connected to the label printer 100 via a USB cable 9.

The label printer 100 has a housing 101, and an opening/closing lid 102 is disposed on an upper surface portion of the housing 101 such that the lid can be opened and closed (or the lid may be made detachable and attachable). A tape discharging exit 104 is disposed in a front surface portion of the housing 101. The tape discharging exit 104 is used for discharging a label tape 423 with print (see FIG. 4 described later) produced in the housing 101 to the outside of the housing 101.

The barcode reader BR is disposed in a storage location (e.g., a warehouse, a storeroom) of a plurality of the cartridges 410 (corresponding to an example of storage bodies) usable in the label printer 100 and optically reads information from a barcode BC disposed on each of the cartridges 410. The information (such as cartridge ID defined as individual identification information of each of the cartridges 410, type information indicative of the type of the cartridge 410, and a date of manufacture) read by the barcode reader BR is output as storage information of the cartridge 410 to the label printer 100 via the above described USB cable 9.

FIG. 3 is a perspective view showing an appearance configuration of a cartridge holder 427 (corresponding to an example of an attaching part) inside the housing 101 and the cartridge 410 to be attached thereto with the above described opening/closing lid 102 of the label printer 100 opened. In FIG. 3, the above described opening/closing lid 102 opened upward is not shown for avoiding complexity of illustration. FIG. 4 is a view showing a peripheral portion of the cartridge holder 427 with the cartridge 410 attached thereto together with the cartridge 410.

In FIGS. 3 and 4, the label printer 100 includes inside the housing 101 the cartridge holder 427 to which the above described cartridge 410 can be attached/detached, a printing head 419, a feeding roller driving shaft 430 (corresponding to an example of a feeder), and a ribbon take-up roller driving shaft 431. In this example, the cartridge 410 is a box body formed into a substantially rectangular parallelepiped shape as a whole, and a head insertion opening 439 penetrating both the top and bottom surfaces is formed in a portion thereof.

The cartridge 410 has a base tape roll 417 formed by winding a base tape 416, a cover film roll 412 formed by winding a cover film 411 that is a print-receiving medium, a ribbon supply side roll 414 feeding out an ink ribbon 413 for print (not necessary in the case that the print-receiving medium is a thermal tape), a ribbon take-up roller 415 taking up the ink ribbon 413 after print, and a feeding roller 418.

The base tape roll 417 has the above described base tape 416 wound around a base tape spool 417a.

The base tape 416 has a laminated structure of multiple layers (four layers in this example) (see a partially enlarged view in FIG. 4). Specifically, from the inner wound side (the right side of the partially enlarged view) toward the opposite side (the left side of the partially enlarged view), the base tape 416 includes an adhesive layer 416a made of a suitable adhesive for affixing the above described cover film 411, a tape base layer 416b made of PET (polyethylene terephthalate) etc., an adhesive layer 416c made of a suitable adhesive, and a separation sheet 416d laminated in this order.

The separation sheet 416d is a sheet to be peeled off when a finally completed print label (see FIGS. 6, 7, etc. described later) is affixed to an object such as a desired article, so that the label can be affixed by the adhesive layer 416c to the object.

The cover film roll 412 has the above described cover film 411 having substantially the same width as the above described base tape 416 in this example and wound around a cover film spool 412a.

The ribbon supply side roll 414 has the above described ink ribbon 413 wound around a ribbon supply side spool 414a.

The ribbon take-up roller 415 includes a ribbon take-up spool 415a and is driven by the above described ribbon take-up roller driving shaft 431 of the cartridge holder 427 to take up and wind the above described printed (used) ink ribbon 413 around the ribbon take-up spool 415a.

The feeding roller 418 is driven by the above described feeding roller driving shaft 430 of the cartridge holder 427 to feed the above described base tape 416 and the above described cover film 411 in a direction indicated by an arrow T of FIG. 4 while pressing and bonding the tapes into the label tape 423 with print.

The above described ribbon take-up roller 415 and the feeding roller 418 are rotationally driven in conjunction with each other by a drive force transmitted from a feeding motor 433 (see FIG. 5 described later) that is, for example, a pulse motor provided outside the cartridge 410, through a gear mechanism not shown to the above described ribbon take-up roller driving shaft 431 and the feeding roller driving shaft 430, respectively.

On the other hand, the cartridge holder 427 has the above described printing head 419, the above described ribbon take-up roller driving shaft 431, the above described feeding roller driving shaft 430, and a roller holder 422.

The printing head 419 has a multiplicity of heat generation elements and forms a print on the cover film 411 fed out and transported from the above described cover film roll 412.

The feeding roller driving shaft 430 drives the above described feeding roller 418 to feed the above described cover film 411 fed out (supplied) from the cover film roll 412 of the cartridge 410 attached to the cartridge holder 427 and the above described base tape 416 fed out from the base tape roll 417.

The roller holder 422 is pivotally supported by a support shaft 429 and can be switched between a print position and a release position by a switching mechanism A platen roller 420 and a tape pressure contact roller 421 are rotatably disposed on the roller holder 422 and, when the roller holder 422 is switched to the above described print position, the platen roller 420 and the tape pressure contact roller 421 are pressed against the above described printing head 419 and the feeding roller 418.

Additionally, the cartridge holder 427 has a cutter 428 disposed adjacently to a discharging exit (not shown) of the cartridge 410. The cutter 428 is actuated by exciting a solenoid 435 (see FIG. 1 described later) and completely cuts the label tape 423 with print in the thickness direction to generate a print label L described later (see FIG. 6 described later).

In the above described configuration, after the cartridge 410 is attached to the above described cartridge holder 427, the ribbon take-up roller driving shaft 431 and the feeding roller driving shaft 430 are rotationally driven in synchronization with each other by the drive force of the feeding motor 433 (see FIG. 5 described later). The driving of the feeding roller driving shaft 430 rotates the feeding roller 418, the platen roller 420, and the tape pressure contact roller 421, and the base tape 416 is fed out from the base tape roll 417 and supplied to the feeding roller 418 as described above. On the other hand, the cover film 411 is fed out from the cover film roll 412, and the multiple heat generation elements of the printing head 419 are energized by a printing head driving circuit 432 (see FIG. 5 described later). In this state, the ink ribbon 413 is pressed against the above described printing head 419 and thereby brought into contact with the back surface of the cover film 411. As a result, a desired print (mirror image print) is formed in a desired print area on the back surface of the cover film 411. The above described base tape 416 and the cover film 411 after completion of the above described print are bonded and integrated by the feeding roller 418 and the tape pressure contact roller 421 into the label tape 423 with print, which is transported to the outside of the cartridge 410. The label tape 423 with print is then cut by the cutter 428 to generate the above described print label (corresponding to a printed matter) having the desired print.

FIG. 5 is a functional block diagram showing a functional configuration of the label printer 100.

In FIG. 5, a control circuit 440 is disposed on a control board (not shown) of the label printer 100. The control circuit 440 comprises a CPU 444 (corresponding to an example of a computer), and the CPU 444 is connected through a data bus 442 to an I/O interface 441, a ROM 446, a memory 447, a RAM 448, and a communication interface 443H. The communication interface 443H is connected through the above described USB cable 9 to the above described bar-code reader BR.

The ROM 446 stores various programs necessary for control (including a storage body management program for executing a control procedure shown in FIGS. 8 and 13 described later). The CPU 444 executes various calculations on the basis of the various programs stored in the ROM 446. The RAM 448 temporarily stores various calculation results etc. calculated by the CPU 444.

The I/O interface 441 is connected to the printing head drive circuit 432 for driving the above described printing head 419, a feeding motor drive circuit 434, a solenoid drive circuit 436 driving the above described solenoid 435, and a display part 437 (not shown in FIGS. 1, 2, etc.).

The feeding motor drive circuit 434 drives the feeding motor 433 to drive the feeding roller driving shaft 430 and the ribbon take-up roller driving shaft 431 described above, thereby transporting the base tape 416, the cover film 411, and the label tape 423 with print.

The solenoid drive circuit 436 excites the solenoid 435 driving the above described cutter 428 to perform a cutting operation.

Example of Print Label

Description will be made of an example of the above described print label L formed by completing the cutting of the label tape 423 with print by the print printer 100 as described above, with reference to FIGS. 6 and 7. In FIGS. 6 and 7, the print label L has a five-layer structure in which the cover film 411 is added to the four-layer structure shown in FIG. 4 as described above. Specifically, the above described cover film 411, the above described adhesive layer 416a, the above described tape base layer 416b, the above described adhesive layer 416c, and the above described separation sheet 416d are included as the five layers from the cover film 411 side (the upper side of FIG. 7) toward the opposite side (the lower side of FIG. 7). In this example, a desired print R (characters "ABC" in this example corresponding to an example of a print object) is printed on a print area S (specifically, a back side thereof) included in the cover film 103.

Background of Embodiment

As described above, the cartridge 410 is attached to the label printer 100, the above described base tape 416 and the cover film 411 supplied from the cartridge 410 are fed, and the above described print object is formed on the fed cover film 411 to form the print label L. As the print labels L are sequentially formed in this manner, the cover film 411 is gradually consumed (together with the base tape 416). Although neither shown in the figures nor described in detail in the above description, the above described label printer 100 has a known appropriate remaining amount detection mechanism (corresponding to a remaining amount detecting device. e.g., a mechanism detecting and accumulating an amount of feeding of the cover film 411, detecting a change in outer diameter of the cover film roll 412 etc., or detecting a change in the number of rotations of the cover film roll 412) that detects a remaining amount (or a use amount. the same applies hereinafter) of the cover film 411 in the cartridge 410 corresponding to the above described consumption. As a result of the above described consumption, finally, the printable cover film 411 in the cartridge 410 runs out. In this case, a new cartridge 410 of the same type stocked in the above described storage location is attached to the cartridge holder 427, and the production of the print label L is continued. In this way, by continuing the production of the print label L, the cartridge 410 of the corresponding type is sequentially consumed.

As described above, in this embodiment, such a consumption status of the cartridge 410 is managed by the label printer 100 on the user side. Specifically, in the above described storage location, multiple types of the cartridges 410 are stocked in advance for use with the label printer 100. The types and the numbers of these stocked cartridges 410 are registered in the label printer 100 by reading the barcode BC with the above described barcode reader BR (see FIGS. 1 and 2). When a certain type of the cartridge 410 becomes insufficient in quantity due to the consumption as described above, the label printer 100 makes a request through the above described network NW to the management server 10 on the manufacturer side for delivery of the cartridges 410 of the type for replenishment (=order). When the above described replenishment is requested, the cartridge 410 of the above described type is delivered to the user side (=shipping/delivery).

However, depending on a consumption status of each type of the cartridge 410, the above described order may be placed too early so that an elapse of a long period before actual use after reception on the user side results in a deterioration in quality, or expiration of a use period, of the cover film 411, or contrarily, an order may be placed too late to be in time for use with the label printer 1. Therefore, it may be difficult to place the order for the cartridge 410 at an appropriate timing.

Overview of Embodiment

A main part of this embodiment is a technique in which the cartridge 410 can be ordered at an appropriate timing depending on a consumption status of each type of the cartridge 410 to deal with the above described situations. The details will hereinafter be described in order.

A control procedure executed by the CPU 444 of the label printer 100 for implementing the above described technique will be described with reference to a flowchart shown in FIG. 8.

Control Flow

In FIG. 8, first, at step S5, the CPU 444 determines whether or not it is a predetermined totalization time for totalizing the storage information of the cartridges 410. In other words, in this embodiment, for example, it is scheduled that when the above described totalization time comes once every day, the storage information read by the barcode reader BR as described above is acquired by the CPU 444 (see step S50 described later). The determination of step S5 is negative (S5: NO) until the totalization time comes, and the procedure goes to step S10.

At step S10, the CPU 444 determines with a known method whether or not the cartridge 410 is attached to the above described cartridge holder 427. Although neither shown in the figures nor described in detail, for example, the cartridge holder 427 comprises a contact or non-contact sensor capable of detecting that the cartridge 410 is attached, and the CPU 444 makes the above described determination on the basis of the detection result of this sensor. After waiting in a loop while the determination is negative (S15: NO) until the cartridge 410 is attached to the cartridge holder 427, and if the cartridge 410 of any type is attached, the determination becomes affirmative (S15: YES), and the procedure goes to step S15.

At step S15, the CPU 444 detects with a known method the type and the individual identification information (e.g., individual identification number, the same applies hereinafter) of the cartridge 410 attached to the above described cartridge holder 427. Although neither shown in the figures nor described in detail, for example, similar to the above description, the cartridge holder 427 comprises a contact or non-contact sensor capable of detecting the type of the cartridge 410, and the CPU 444 acquires the type and the individual identification information of the above described cartridge 410 on the basis of the detection result of the sensor. The above described sensor and the sensor used at step S15 may be the same sensor. In this case, the above described cartridge attachment determination may be made at the timing of step S15, or conversely, the cartridge type and the individual identification information may be acquired at the timing of step S10. Step S15 corresponds to an identification step described in claims, and the process executed at step S15 corresponds to an identification process. Subsequently, the procedure goes to step S20.

At step S20, the CPU 444 determines whether or not the cartridge 410 attached to the above described cartridge holder 427 is the oldest cartridge of the type. In other words, the CPU 444 determines whether or not a cartridge of the same type as and older than the above described attached cartridge 410 is kept in the above described storage location in an unused state. This determination may be made on the basis of the above described storage information that is acquired at step S50 described later and that is the latest at this time point. In the case that the above described attached cartridge 410 is the oldest cartridge of the type, the determination of step S20 is affirmative (S20: YES), and the procedure goes to step S30 described later. In the case that the above described attached cartridge 410 is not the oldest cartridge of the type, the determination of step S20 is negative (S20: NO), and the procedure goes to step S25.

At step S25, the CPU 444 outputs a display control signal to the above described display part 437 (see FIG. 5) and causes the display part 437 to display a warning message reporting that the cartridge 410 of the same type as and older than the above described attached cartridge 410 remains in the above described storage location in an unused state (i.e., the attached cartridge 410 is not the oldest cartridge of the type). An example of this warning message is shown in FIG. 9. In the example, the display part 437 displays a text message "CARTRIDGE OLDER THAN ATTACHED CARTRIDGE EXISTS. USING THE FOLLOWING CARTRIDGE FIRST IS RECOMMENDED" and a text message "SER No. U64893E7Z256977" indicative of the individual identification number of the old cartridge 410. When the display of such a warning message ends, the procedure goes to step S30. Step S25 corresponds to an example of a reporting step described in claims.

At step S30, the CPU 444 determines, for example, through an appropriate operation part disposed on the label printer 100, whether or not a print instruction is issued by the user. The determination is negative (S30: NO) until a print instruction is issued, and the procedure returns to step S5 to repeat the same procedure. In this case, if the attached cartridge 410 is removed, the determination of step S10 becomes negative, and when the cartridge 410 of the same type is reattached or a cartridge of another type is attached, the determination of step S10 becomes affirmative, which is followed by step S15 at which the type and the individual identification number of the cartridge 410 are acquired and step S20 (and step S25 as needed), before the determination of the above described print instruction is made again at step S30.

When the above described print instruction is issued by the user, the determination of step S30 becomes affirmative (S30: YES), and the procedure goes to step S35.

At step S35, the CPU 444 accepts various settings from the user. In the case that specific settings are made by the user, the details of the settings are accepted at step S35, and the details of the settings are reflected (not described in detail). In the case that no specific setting is made by the user, step S35 is omitted. Subsequently, the procedure goes to step S40.

At step S40, the CPU 444 executes a printing process to produce the above described print label L. Specifically, as described above, while the cover film 411 and the base tape 416 are fed, the above described desired print object (the print R in the example described above) is formed on the cover film 411 by the printing head 419 to generate the label tape 423 with print. The label tape 423 with print is cut by the cutter 428 as necessary. Through these processes, the above described print label L including the above described print object is generated. Subsequently, the procedure goes to step S45.

At step S45, the CPU 444 acquires the remaining amount of the above described cover film 411 (or the base tape 416) of the cartridge 410 detected by the remaining amount detection mechanism described above and stores the acquired remaining amount in association with the individual identification number of the cartridge 410 detected at step S15. In the case that a remaining amount has already been acquired and stored, the amount is updated to the newly acquired latest value and stored. This remaining amount acquisition/update may be performed during the printing process at step S40. Subsequently, the procedure returns to step S5 to repeat the same procedure.

Each time a print instruction is issued while the cartridge 410 is attached as described above, the flow is repeated through steps S30→S35→S40→S45 etc. is repeated so that the remaining amount of the cover film 411 is recognized in association with the above described individual identification number of the cartridge 410. In this process, if the cartridge 410 is replaced, the remaining amount is stored in association with the individual identification number of the new cartridge 410 after the replacement. In this way, for each of the individual cartridges 410 used, the individual identification number thereof and the corresponding remaining amount are sequentially stored in association with each other. Eventually, when the totalization time comes, the determination of step S5 becomes affirmative (SS: YES), and the process goes to the step S50.

At step S50, the CPU 444 acquires the above described storage information of the cartridges 410 in the above described storage location and registers the information to an appropriate place (e.g., the above described memory 447). Specifically, when the multiple cartridges 410 are received from the above described factory, the above described barcodes BC of all the cartridges 410 are read by the above described barcode reader BR. On the basis of the reading result, the CPU 444 acquires and registers the above described storage information (varying over time) that is the total number of the owned cartridges indicative of how many cartridges 410 of what type are stored in the above described storage location (in the case that one of the cartridges 410 is already attached to the cartridge holder 427, the cartridge 410 is included) for each type of the cartridges 410. After the cartridges are once received as described above (e.g., from the day after a reception date), the storage information updated and stored at step S115 described later is acquired again at step S50. Step S50 corresponds to an example of a registration step described in claims, and the process executed at step S50 corresponds to an example of a registration process described in claims.

This storage state is displayed on the above described display part 437 in a list format, for example. An example will be described with reference to FIGS. 10A and 10B. FIG. 10A shows an example of display on the display part 437 showing contents set in advance before registration of the above described storage information (e.g., set by a manufacturer's serviceman at the time of disposition of the label printer 100).

In the example of FIG. 10A, six types of the cartridges 410 usable in the label printer 100 are set as "cartridge A", "cartridge B", "cartridge C", "cartridge D", "cartridge E", and "cartridge F". Since the registration is not yet performed, the respective stock quantities (quantities of stock) are represented by "*" indicative of a non-input state. In a field of "expected delivery period", an appropriate value (number of days) is set by a serviceman etc. as described above (or may be set by a user of the label printer 100. the same applies hereinafter) as the number of days expected when the cartridges 410 are ordered as described later and delivered from the above described manufacturer side (the factory 30 etc.) to the above described storage location. In this example, the number of days is represented by "* days±* days" corresponding to a state before setting.

When the above described storage information corresponding to the reading result of the above described barcode reader BR is input as described above at step S50 from the above described state, for example, as shown in FIG. 10B, the number of cartridges stored in the above described storage location is displayed as a numerical value for each type of the cartridges 410. In the example shown in FIG. 10B, the numbers of cartridges received in the storage location and registered are 20 for the cartridge A, 10 for the cartridge B, 5 for the cartridge C, 0 for the cartridge D (not used), 10 for the cartridge E, and 0 for the cartridge F (not used) are. In the example of FIG. 10B, the above described expected delivery period is already set (described in detail later).

Upon completion of step S50, the procedure goes to step S55. At step S55, the CPU 444 determines whether or not the above described expected delivery period has been set by the above described serviceman etc. For example, as shown in FIG. 10B, in the case that the expected delivery period has been set (5 days±1 day in the example shown in FIG. 10B), the determination is affirmative (S55: YES), and the procedure goes to step S60.

At step S60, the CPU 444 determines whether or not the time after the reception of the cartridges 410 is short. This determination is made because if the time after the reception is short, the delivery period set in advance as described above is compared with the actual required delivery period from the order to the reception to make a correction (described later) so that the difference therebetween becomes smaller. If the time after the reception is not short, the determination is negative (S60: NO), and the procedure goes to step S75.

At step S75, the CPU 444 totalizes the consumption amount of the cartridges 410 for each type of the cartridges 410 in accordance with the individual identification results and the remaining amount detection results of the cartridges 410 (i.e., the remaining amount of the cover film 411. in other words, the consumption amount) sequentially stored by repeating steps S5-S45 as described above on the previous day of the time point at which step S75 is executed. The "consumption amount of the cartridge" is the consumption amount of the cover film 411 represented in terms of the cartridge. Specifically, for example, counting is performed on the basis of the entire length of the unused cover film 411 in one cartridge 410 as follows: "the consumption amount of the cartridge is 0.5" in the case that the cover film 411 having a length equal to half of the entire length is consumed; "the consumption amount of the cartridge is 0.75" in the case that the cover film 411 having a length equal to three fourths of the entire length is consumed; and "the consumption amount of the cartridge is 1" in the case that the entire length of the cover film 411 is all consumed (see FIG. 11 etc. described later). The same counting method is used in the subsequent procedures. Step S75 corresponds to an example of a totalization step described in claims, and the process executed by the CPU 444 at step S70 corresponds to an example of a totalization process described in claims.

Subsequently, the procedure goes to step S80, and the CPU 444 calculates an average consumption amount of the cartridges 410 per unit period (one day in this example) for each type of the cartridges 410 on the basis of the above described totalization result of step S75. Specifically, since the procedures of steps S50-S115 are executed once every day by returning from step S115 described later to step S10 described above, the above described totalization is performed each day through the process of step S75, and the totalization result is accumulated for each day. At step S80, on the basis of the totalization result at the time point of execution of this process, which has been accumulated for each day through the process of step S75 as described above, the average consumption amount of the cartridges 410 per unit period is calculated for each type of the cartridges 410 (therefore, the calculation result may differ every day). Step S80 corresponds to an example of a calculation step described in claims, and the process executed by the CPU 444 at step S80 corresponds to an example of a calculation process described in claims.

Subsequently, at step S85, on the basis of the calculation result at step S80 (i.e., an average of consumption of each type of the cartridges 410 per unit period), the CPU 444 predicts a consumption completion timing (e.g., a consumption completion date see FIG. 11B described later) of the cartridges 410 for each type. In this process of step S85, as in the above description, the consumption completion timing of the cartridges 410 is predicted on the basis of the latest average consumption amount of the cartridges 410 per unit period at the time point of execution of this process, which has been calculated at the step S80 as described above. Step S85 corresponds to an example of a prediction step described in claims, and the process executed by the CPU 444 at step S85 corresponds to an example of a prediction process described in claims.

FIG. 11A is an explanatory diagram showing an example of results of the totalization process of step S75, the calculation process of step S80, and the prediction process of step S85. This example shows a state in which 94 days have elapsed from the state shown in FIG. 10B above (=94 elapsed days).

In FIG. 11A, among 20 cartridges stored for the cartridge A at the time of reception as shown in FIG. 10B described above, 18.80 [cartridges] have been consumed after the elapse of 94 days so that the number of remaining cartridges is 1.20 [cartridges], and the average daily consumption amount for 94 days is 0.20 [cartridges]. As a result, the remaining number of days for the stock usable for processing at this point is the above described 1.20/0.20=6.00 [days], so that the consumption completion timing of the cartridge A is predicted to come after 6 days.

Similarly, among 10 cartridges stored for the cartridge B at the time of reception as shown in FIG. 10B described above, 4.70 [cartridges] have been consumed after the elapse of 94 days so that the number of remaining cartridges is 5.30 [cartridges], and the average daily consumption amount for 94 days is 0.05 [cartridges]. As a result, the remaining number of days for the stock usable for processing at this point is the above described 5.30/0.05=106.00 [days], so that the consumption completion timing of the cartridge B is predicted to come after 106 days.

Similarly, among 5 cartridges stored for the cartridge C at the time of reception as shown in FIG. 10B described above, 0.94 [cartridges] have been consumed after the elapse of 94 days so that the number of remaining cartridges is 4.06 [cartridges], and the average daily consumption amount for 94 days is 0.01 [cartridges]. As a result, the remaining number of days for the stock usable for processing at this point is the above described 4.06/0.01=406.00 [days], so that the consumption completion timing of the cartridge C is predicted to come after 406 days.

Similarly, among 10 cartridges stored for the cartridge E at the time of reception as shown in FIG. 10B described above, 3.76 [cartridges] have been consumed after the elapse of 94 days so that the number of remaining cartridges is 6.24 [cartridges], and the average daily consumption amount for 94 days is 0.04 [cartridges]. As a result, the remaining number of days for the stock usable for processing at this point is the above described 6.24/0.04=156.00 [days], so that the consumption completion timing of the cartridge E is predicted to come after 156 days.

Returning to FIG. 8, when step S85 is completed as described above, the procedure goes to step S90. At step S90, the CPU 444 determined whether or not a certain type of the cartridges 410 has a difference less than a predetermined threshold value (e.g., 1 day) between a remaining period before the consumption completion timing of each cartridge type (the "remaining number of days" of FIG. 11A) and the expected delivery period described above (4 days±1 day, i.e., up to 5 days, in the above example). In the case that no type has a difference less than the above described threshold value between the above described remaining period and the above described expected delivery period (S90: NO), and the procedure goes to step S115 described later. On the other hand, if any one type has a difference less than the above described threshold value between the above described remaining period and the above described expected delivery period as in the case of the cartridge A in the example shown in FIG. 11A (the remaining number of days is six and the difference from the above described expected delivery period is one day), the determination is affirmative (S90: YES), and the process goes to step S95.

At step S95, the CPU 444 executes an order process for the certain type of the cartridges 410 having a difference less than the threshold value at step S90. Specifically, a request is made (an order is placed) for delivery of the above described certain type of the cartridges 410 through the network NW to the management server 10. In the example described above, only the cartridge A is ordered (in this example, 20 [cartridges] are ordered as shown in FIG. 11A). The present disclosure is not limited to comparing the difference between the above described remaining period and the above described expected delivery period with the above described threshold value as in step S90, this order process at step S95 may be executed by using another technique capable of estimating the timing at which the order should be placed. In short, the order process only needs to be executed in accordance with a difference between the above described consumption completion timing and the above described expected delivery period. Subsequently, the procedure goes to step S100.

At step S100, the CPU 444 determines whether or not the types (the cartridges B, C, E in the above described example) other than the certain type at step S90 (the cartridge A in the above described example) include a type having the remaining period before the consumption completion timing of the type shorter than an elapsed period from the reception to the date of the order process (=first elapsed period. 94 days+6 days=100 days for the above described cartridge A) of the above described certain type of the cartridges 410 (the cartridge A in the above described example). If no type has the period shorter than the first elapsed period, the determination is negative (S100: NO), and the procedure goes to step S110 described later. On the other hand, as in the case of the cartridge B of the example shown in FIG. 11B described later, if any one of the types has the period shorter than the elapsed period from the reception to the date of the order process (=the first elapsed period. 94 days+6 days=100 days for the above described cartridge A) of the above described certain type of the cartridges 410 (the cartridge A in the above described example), the determination is affirmative (S100: YES) and the process goes to step S105.

At step S105, the CPU 444 executes an order process for another type of the cartridges 410 corresponding to step S100 in addition to the certain type of the cartridges 410 corresponding to step S95. Specifically, a request is made (an order is placed) for delivery of both the above described certain type and the other type of the cartridges 410 through the network NW to the management server 10.

FIG. 11B shows an example in which two types of cartridges are ordered as described above. Specifically, in the example shown in FIG. 11B, only the values related to the cartridge B are different from the example shown in FIG. 11A. Specifically, in FIG. 11B, among 10 cartridges stored for the cartridge B at the time of reception as shown in FIG. 10B described above, 7.52 [cartridges] have been consumed after the elapse of 94 days so that the number of remaining cartridges is 2.48 [cartridges], and the average daily consumption amount for 94 days is 0.08 [cartridges]. As a result, the remaining number of days for the stock usable for processing at this point is the above described 2.48/0.08=31.00 [days], so that the consumption completion timing of the cartridge B is predicted to come after 31 days.

In this case, regarding the cartridge A, the remaining number of days is 6 [days] after 94 days have elapsed as in the example of FIG. 11A, so that 20 cartridges are ordered at step S60, and on the other hand, the above described consumption completion timing of 31 days of the above described cartridge B is shorter than the elapsed period from the reception to the date of the order process of the cartridge A, which is the above described 100 days. As a result, at step S105 following the affirmative determination of step S100, the order for this cartridge B is also placed. The ordering quantity in this case is adjusted such that, for example, the cartridge B runs out at the next consumption completion timing (after 100 days) of the cartridge A. In this example, since the stock for 31 days still exists, the stock quantity is subtracted from the ordering quantity of cartridges. In the example shown in FIG. 11B, consideration is also given to days for delivery, and 5 [cartridges] are ordered for the cartridge B. Steps S95 and S105 correspond to an example of an order step described in claims, and the processes executed at steps S95 and S105 correspond to an example of an order process described in claims. Subsequently, the procedure goes to step S110.

At step S110, the CPU 444 stores the types of the cartridges 410 ordered at step S95 and step S105 in an appropriate place (e.g., the memory 447). Subsequently, the procedure goes to step S115.

At step S115, the CPU 444 updates the storage information of the cartridge 410 at the above described storage location in a manner reflecting the order at steps S95 and S105 and stores the information in an appropriate place (e.g., the memory 447). Specifically, in the case that the cartridges 410 ordered as described above have been safely delivered and have arrived, the above described barcodes BC on the cartridges 410 having arrived are read by the above described barcode reader BR. On the basis of the reading result, the above described storage information is updated and stored. Upon completion of step S115, the procedure returns to step S10, and the same procedure is subsequently repeated.

On the other hand, at step S60 following the affirmative determination of step S55 when the expected delivery period has already been set, in the case that the time after the reception of the cartridges 410 is short (in other words, the execution date of step S60 is the reception data of at least one type of the cartridges 410), the determination of step S60 is affirmative (S60: YES), and the procedure goes to step S65.

At step S65, the CPU 444 corrects the expected delivery period in accordance with the above described actual required delivery period (corresponding to a second elapsed period) having elapsed between the actual reception timing of the above described ordered cartridges 410 of the certain type (the cartridge A in the example described above) and the order timing of the above described order. For example, in the example described above, assuming that the cartridge A is actually delivered to the user side after 4 days from the order for the cartridge A at step S95 when the original expected delivery period is 5 days as shown in FIG. 10B, the above described expected delivery period is reduced by one day from "5 days" and corrected to "4 days". Conversely, assuming that the cartridge A is actually delivered to the user side after 6 days, the above described expected delivery period is extended by one day from "5 days" and corrected to "6 days". Upon completion of step S65, the procedure goes to step S75, and the same procedure is subsequently performed. Step S65 corresponds to an example of a period correction step described in claims.

In the case that the above described expected delivery period has not yet been set by the above described serviceman etc. at step S55, the determination is negative (S55: NO), and the procedure goes to step S70.

At step S70, the CPU 444 accepts an input of the above described expected delivery period through a manual operation by the above described serviceman etc. Upon completion of step S70, the procedure goes to step S75, and the same procedure is subsequently performed. Step S70 corresponds to an example of an acceptance step described in claims.

The present disclosure is not limited to the above described embodiment and can variously be modified without departing from the spirit and the technical ideas thereof. Such modification examples will hereinafter be described in order. The portions equivalent to those of the embodiment are denoted by the same reference numerals and will not be described or will be described in a simplified manner as needed.

(1) Technique of Information Acquisition Through Communication With Cartridge Memory In the above described embodiment, the total number of the owned cartridges 410 and the date of manufacture of the cartridges 410 are acquired on the basis of the detection signal of the barcode reader BR for the barcode BC included in the cartridge 410. Alternatively, the cartridge 410 may comprise a memory, and the label printer 100 may comprise an appropriate communication means capable of wireless or wired communication with the above described memory. In this case, the CPU 444 acquires the above described total number and the date of manufacture of the owned cartridges 410 at step S50 on the basis of information (e.g., IDs of the cartridges 410) acquired from the above described memories of the cartridges 410 via the above described communication means.

Even in this modification example, on the basis of the total number and the date of manufacture of the owned cartridges 410 acquired for each type on the basis of the result of information communication with the memories of the cartridges 410, the order for storage bodies are placed at an appropriate timing as described above.

(2) In the Case That of Collectively Managing Multiple Label Printers

This modification is the case that the management technique performed for the one label printer 100 in the above described embodiment is collectively performed in multiple (in the following example, two) label printers.

Specifically, for example, as shown in FIG. 12A, first, it is assumed that the same one label printer 100 (IP address "192.168.177.1") as the above described embodiment is already managed with the technique described above. In this case, as in FIG. 10B, the label printer 100 has the storage information related to the cartridges 410 indicative of 20 for the cartridge A, 10 for the cartridge B, 5 for the cartridge C, 0 for the cartridge D (not used), 10 for the cartridge E, and 0 for the cartridge F (not used).

FIG. 12B shows the case that a label printer 100' (corresponding to an example of another printer. IP address "192.168.177.2") having the configuration equivalent to the label printer 100 is added in this state into the same network (subnet) area of the above described label printer 100. In this example, the label printer 100' has the storage information related to the cartridges 410 indicative of 20 for the cartridge A, 10 for the cartridge B, 0 for the cartridge C (not used), 5 for the cartridge D, 0 for the cartridge E (not used), and 10 for the cartridge F. The above described display part 437 included in the label printer 100' then displays a message "THE CARTRIDGE-MANAGING LABEL PRINTER 100 ALREADY EXISTS IN SAME SUBNET. PLEASE SELECT INDIVIDUAL MANAGEMENT OR COLLECTIVE MANAGEMENT". By operating either of an "individual management" button or a "collective management" button displayed on the display part 437, the user can select whether the management technique described in the above described embodiment is performed separately for each of the label printer 100 and the label printer 100' or collectively for both the label printer 100 and the label printer 100'.

When the user operates the "collective management" button to select the collective management of the label printer 100 and the label printer 100', as shown in FIG. 12C, the CPU 444 of the label printer 100 (corresponding to an example of a first computer) reads the storage information of the label printer 100' in coordination with the CPU 444 (corresponding to an example of a second computer) of the label printer 100' and combining the storage information and its own storage information of the label printer 100 to generate storage information for collective management (separately from the above described own storage information of the label printer 100). In this case, as shown in FIG. 12C, the storage information indicates 40 (=20+20) for the cartridge A, 20 (=10+10) for the cartridge B, 5 (=5+0) for the cartridge C, 5 (=0+5) for the cartridge D, 10 (=10+0) for the cartridge E, and 10 (=0+10) for the cartridge F.

The above described print head 419 included in the above described label printer 100 corresponds to an example of a first printing head, the above described feeding roller driving shaft 430 corresponds to an example of a first feeder, the above described printing head 419 included in the label printer 100' corresponds to an example of a second printing head, and the above described feeding roller driving shaft 430 corresponds to an example of a second feeder.

FIG. 13 shows a control flow executed by the CPU 444 of the label printer 100 in this modification example (the CPU 444 of the label printer 100' executes the same procedure as in FIG. 9).

The flow shown in FIG. 13 includes steps S50', S75', S80', S85' instead of steps S50, S75, S80, S85 in the flow of FIG. 8 and does not include steps S55 and S70. The other procedures of steps S5-S45, S60, S65, and S90-S115 are the same as those of FIG. 8. The process executed by the CPU 444 of the label printer 100 at step S15 corresponds to a first identification process described in claims, and the process performed executed by the CPU 444 of the label printer 100' at step S15 corresponds to a second identification process described in claims.

Specifically, at step S50' following the affirmative determination (S5: YES) when the above described totalization time comes, the CPU 444 of the label printer 100 acquires pieces of the above described storage information of the two label printers 100, 100' in the same way as step S50, combines the pieces of the storage information as described above to separately generate and register new storage information for the two printers. The process executed at step S50' corresponds to an example of a combined registration process described in claims.

After step S50', at step S75' following steps S60 and S65 as in FIG. 8, the CPU 444 of the label printer 100 totalizes the consumption amount of the cartridges 410 in the label printers 100, 100' for each type in the same way as step S75 on the basis of the same identification result and remaining amount detection result as described above for the cartridges 410 attached to the cartridge holder 427 (corresponding to an example of a first attaching part) of the label printer 100 and the cartridge holder 427 (corresponding to an example of a second attaching part) of the label printer 100'. The above described remaining amount detection mechanism of the label printer 100 in this case corresponds to a first remaining amount detecting device, and the above described remaining amount detection mechanism of the label printer 100' corresponds to a second remaining amount detecting device. The process executed at step S75' corresponds to an example of a combined totalization process described in claims.

Subsequently, at step S80', the CPU 444 of the label printer 100 calculates an average consumption amount of the cartridges 410 per unit period (one day according to the example described above) of the cartridges 410 for each type of the cartridges 410 in the same way as step S80 of FIG. 8 on the basis of the totalization results of step S75'. The process executed at step S80' corresponds to an example of a combined calculation process described in claims.

Subsequently, at step S85', the CPU 444 of the label printer 100 predicts a consumption completion timing (the consumption completion date according to the example described above) of the cartridges 410 when the label printers 100, 100' are viewed as being integrated, for each cartridge type in the same way as step S85 of FIG. 8 on the basis of the calculation result at step S80'. The process executed at step S85' corresponds to an example of a combined prediction process described in claims.

Subsequently, at step S95 following step S90 as in FIG. 8, the CPU 444 of the label printer 100 executes the order process for the cartridges 410 of the certain type having the difference less than the above described threshold value when the label printers 100, 100' are viewed as being integrated, as described with reference to FIG. 8. Subsequently, at step S105 following step S100 as in FIG. 8, the CPU 444 executes an order process for another type of the cartridges 410 corresponding to step S100 in addition to the certain type of the cartridges 410 corresponding to step S95. The processes executed at steps S95 and S105 correspond to an example of a combined order process described in claims.

(3) Others

Although a print is performed on the cover film 411 different from the base tape 416, and the base tape 101 and the cover film 103 are affixed together in the method described above; however, the present disclosure is not limited thereto, and the present disclosure may be applied to a method in which a print is performed on a print-receiving tape layer included in a base tape (a type without affixing). In this case, the base tape corresponds to an example of a print-receiving medium.

Furthermore, in the above description, the print-receiving tape roll formed by winding a print-receiving medium (the cover film 411 in the above described example) and the base tape roll formed by winding the base tape 416 are arranged in the cartridge 410 and the print-receiving medium is fed out from the above described print-receiving tape roll; however, the present disclosure is not limited thereto. For example, it is conceivable that a cartridge having a different shape (corresponding to an example of a storage body in this case) including only the print-receiving tape roll is disposed or that a roll formed by winding the above described print-receiving medium is detachably attached directly to the label printer side (in this case, the roll corresponds to an example of the storage body).

It is noted that terms "vertical", "parallel", "plane", etc. in the above description are not used in the exact meanings thereof. Specifically, these terms "vertical", "parallel", "plane", etc. allow tolerances and errors in design and manufacturing and have meanings of "substantially vertical", "substantially parallel", and "substantially plane", etc.

It is noted that terms "same", "equal", "different", etc. in relation to a dimension and a size of the appearance in the above description are not used in the exact meaning thereof. Specifically, these terms "same", "equal", and "different" allow tolerances and errors in design and manufacturing and have meanings of "substantially the same", "substantially equal", and "substantially different".

The arrows shown in the figures such as FIG. 5 indicate an example of a signal flow and are not intended to limit the signal flow directions.

The flowcharts shown in FIGS. 8, 13, etc. are not intended to limit the present disclosure to the procedures shown in the flows, and the procedures may be added/deleted or may be executed in different order without departing from the spirit and the technical ideas of the disclosure.

The techniques of the embodiment and modification examples may appropriately be utilized in combination other than those described above.

What is claimed is:

1. A non-transitory computer-readable medium storing a storage body management program executable by a computer of a printer, the printer comprising an attaching part configured to attach a storage body that stores a print-receiving medium in a suppliable manner, a feeder configured to feed said print-receiving medium supplied from said storage body attached to said attaching part, a printing head configured to perform a desired print operation on said print-receiving medium fed by said feeder, said computer configured to control said feeder and said printing head, and a remaining amount detecting device configured to detect a remaining amount of said print-receiving medium in said storage body attached to said attaching part, said storage body management program, when executed by the computer, causing the printer to perform steps comprising:

an identification step for identifying said storage body attached to said attaching part;
   a registration step for acquiring and registering a total number of owned storage bodies including said storage body attached to said attaching part for each type of the storage bodies;
   a totalization step for totalizing consumption amounts of said storage bodies in said printer for each type based on an identification result of said identification step and a remaining amount of said print-receiving medium detected by said remaining amount detecting device;
   a calculation step for calculating an average consumption amount per unit period of said storage bodies for each type based on a totalization result in said totalization step;
   a prediction step for predicting a consumption completion timing of the storage bodies for each type based on a registration result of said registration step and a calculation result of said calculation step; and
   an order step for executing an order process for at least one type of said storage bodies in accordance with a prediction result of said prediction step and an expected delivery period of said storage bodies.

2. The medium according to claim 1, wherein said steps further comprise an update step for updating the total number of owned storage bodies correspondingly to arrival of a new storage body resulting from the order process of said storage body in said order step.

3. The medium according to claim 1, wherein in said order step, said order process is executed for a certain type of said storage bodies of which a difference between a remaining period before said consumption completion timing and said expected delivery period becomes less than a predetermined threshold value.

4. The medium according to claim 3, wherein in a case that the types of the storage bodies other than said certain type include a type having said remaining period before said consumption completion timing of the type shorter than a first elapsed period from a reception to a date of said order process of said certain type of the storage bodies, the order process is executed for the type of said storage bodies in addition to said certain type of the storage bodies in said order step.

5. The medium according to claim 3, wherein said steps further comprise a period correction step for correcting said expected delivery period in accordance with a second elapsed period between a reception timing of said certain type of the storage bodies ordered in said order step and an order timing of the order.

6. The medium according to claim 1, wherein said steps further comprise an acceptance step for accepting an input of said expected delivery period of said storage bodies.

7. The medium according to claim 1, wherein in said registration step, based on a detection signal of a barcode reader for a barcode included in said storage body, said total number and a date of manufacture of owned storage bodies are acquired.

8. The medium according to claim 1, wherein
said printer further includes a communication device configured to communicate with a memory included in said storage body, and wherein
in said registration step, based on information acquired from said memory through said communication device, said total number and a date of manufacture of owned storage bodies are acquired.

9. The medium according to claim 1, wherein said steps further comprise a reporting step for, in a case that a storage body older than said storage body attached to said attaching part is kept in an unused state in accordance with the identification result of said identification step and the registration result of said registration step, providing a corresponding report.

10. A printer comprising:
an attaching part configured to attach a storage body that stores a print-receiving medium in a suppliable manner;
a feeder configured to feed said print-receiving medium supplied from said storage body attached to said attaching part;
a printing head configured to perform a desired print on said print-receiving medium fed by said feeder;
a computer configured to control said feeder and said printing head; and
a remaining amount detecting device configured to detect a remaining amount of said print-receiving medium in said storage body attached to said attaching part,
said computer being configured to execute:
an identification process for identifying said storage body attached to said attaching part,
a registration process for acquiring and registering a total number of owned storage bodies including said storage body attached to said attaching part for each of types of the storage bodies,
a totalization process for totalizing consumption amounts of said storage bodies in said printer for each type based on an identification result of said identification process and a detection result of said remaining amount detecting device;
a calculation process for calculating an average consumption amount per unit period of said storage bodies for each type based on a totalization result in said totalization process;
a prediction process for predicting a consumption completion timing of the storage bodies for each type based on a registration result of said registration process and a calculation result of said calculation process; and
an order process for executing an order for at least one type of said storage bodies in accordance with a prediction result of said prediction process and an expected delivery period of said storage bodies.

11. A printer comprising:
a first attaching part configured to attach a storage body that stores a print-receiving medium in a suppliable manner;
a first feeder configured to feed said print-receiving medium supplied from said storage body attached to said first attaching part;
a first printing head configured to perform a desired print on said print-receiving medium fed by said first feeder;
a first computer configured to control said first feeder and said first printing head; and
a first remaining amount detecting device configured to detect a remaining amount of said print-receiving medium in said storage body attached to said first attaching part,
the printer being connected to another printer including: a second attaching part configured to attach a storage body that stores a print-receiving medium in a suppliable manner, a second feeder configured to feed said print-receiving medium supplied from said storage body attached to said second attaching part, a second printing head configured to perform a desired print on said print-receiving medium fed by said second feeder, a second computer configured to control said second feeder and said second printing head, and a second remaining amount detecting device configured to detect a remaining amount of said print-receiving medium in said storage body attached to said second attaching part, said second computer configured to execute a second identification process for identifying said storage body attached to said second attaching part,
said first computer being configured to execute:
a first identification process for identifying said storage body attached to said first attaching part,
a combined registration process for acquiring and registering a combined value of a total number of owned storage bodies including said storage body attached to said first attaching part and said storage body attached to said second attaching part for each type of storage body of the storage bodies,
a combined totalization process for totalizing a combined value of consumption amounts of said storage bodies in said printer and said other printer for each type based on an identification result of said first identification process and a detection result of said first remaining amount detecting device as well as an identification result of said second identification process and a detection result of said second remaining amount detecting device,
a combined calculation process for calculating an average consumption amount per unit period of said storage bodies for each type based on a totalization result in said combined totalization process,
a combined prediction process for predicting a consumption completion timing of the storage bodies for each type based on a registration result of said combined registration process and a calculation result of said combined calculation process, and
a combined order process for executing an order process for at least one type of storage body of said storage bodies in accordance with a prediction result of said combined prediction process and an expected delivery period of said storage bodies.

12. A non-transitory computer-readable medium storing a storage body management program executable by a computer of a printer, the printer comprising an attaching part configured to attach a storage body that stores a print-receiving medium in a suppliable manner, a feeder configured to feed said print-receiving medium supplied from said storage body attached to said attaching part, a printing head configured to perform a desired print operation on said print-receiving medium fed by said feeder, said computer configured to control said feeder and said printing head, and a remaining amount detecting device configured to detect a remaining amount of said print-receiving medium in said storage body attached to said attaching part, said storage body management program, when executed by the computer, causing the printer to perform steps comprising:

an identification step for identifying said storage body attached to said attaching part;

a registration step for acquiring and registering a total number of owned storage bodies including said storage body attached to said attaching part for each type of the storage bodies;

a totalization step for totalizing consumption amounts of said storage bodies in said printer for each type based on an identification result of said identification step and a remaining amount of said print-receiving medium detected by said remaining amount detecting device;

a calculation step for calculating an average consumption amount per unit period of said storage bodies for each type based on a totalization result in said totalization step;

a prediction step for predicting a consumption completion timing of the storage bodies for each type based on a registration result of said registration step and a calculation result of said calculation step;

a determination step for determining whether or not there is a certain type of said storage bodies of which a difference between a remaining period before said consumption completion timing and an expected delivery period becomes less than a predetermined threshold value; and an order step for executing an order process for the certain type of said storage bodies at a time that it is determined that there is the certain type of said storage bodies of which the difference becomes less than the predetermined threshold value.

\* \* \* \* \*